(12) United States Patent
Ibrahim

(10) Patent No.: US 6,643,588 B1
(45) Date of Patent: Nov. 4, 2003

(54) GEOMETRIC BASED PATH PREDICTION METHOD USING MOVING AND STOP OBJECTS

(75) Inventor: Faroog Abdel-Kareem Ibrahim, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/120,676

(22) Filed: Apr. 11, 2002

(51) Int. Cl.$^7$ ................................................. G01S 13/93
(52) U.S. Cl. ..................... 701/301; 701/302; 701/223; 701/96; 340/435; 340/903; 340/988; 342/69; 342/73; 342/90; 342/175; 367/98; 367/103
(58) Field of Search ................................. 701/301, 223, 701/96, 300, 70, 45, 205, 210, 302; 340/436, 435, 988, 903, 933, 935; 342/90, 69, 70, 73, 81, 139, 140, 27, 61, 71, 72, 175; 367/98, 103, 918, 119; 180/170

(56) References Cited

U.S. PATENT DOCUMENTS

| | | | |
|---|---|---|---|
| 4,158,841 A | * 6/1979 | Wiichner et al. | ............... 343/7 |
| 5,926,126 A | 7/1999 | Engelman | |
| 5,964,822 A | * 10/1999 | Alland et al. | ............... 701/301 |
| 6,025,797 A | * 2/2000 | Kawai et al. | ................. 342/70 |
| 6,070,121 A | 5/2000 | Matsuda | |
| 6,202,027 B1 | 3/2001 | Alland et al. | |
| 6,292,752 B1 | * 9/2001 | Franke et al. | ............... 701/300 |
| 2002/0016663 A1 | * 2/2002 | Nakamura et al. | ............ 701/96 |

* cited by examiner

Primary Examiner—Thomas G. Black
Assistant Examiner—Tuan C To
(74) Attorney, Agent, or Firm—Brinks Hofer Gilson & Lione

(57) ABSTRACT

A method for estimating the curvature in a road is disclosed. The method measures an azimuth angle range and relative velocity between a host and a target vehicle, which determines whether a host vehicle is changing lanes or whether a target vehicle is changing lanes. The method calculates a heading angle of the host vehicle and calculates a corrected azimuth angle by adjusting the measured azimuth angle by the value of calculated heading angle. This method selects a curve that minimizes the mean square error between the curve and selected targets; and determines an equation that describes the curve, wherein the equation is used to predict the path head of the host vehicle.

13 Claims, 3 Drawing Sheets

GEOMETRIC BASED PATH PREDICTION METHOD USING MOVING AND STOP OBJECTS

TECHNICAL FIELD

The present invention relates to systems and methods for predicting the path of a host vehicle for safety and non-safety automotive applications, such as adaptive cruise control (ACC).

BACKGROUND

Adaptive cruise control systems are gaining wide spread acceptance in vehicles today. Adaptive cruise control (ACC) systems utilize a conventional cruise control system, which maintains a desired vehicle speed. In addition, the adaptive cruise control system can modify the speed of the vehicle to accommodate for changes in traffic conditions. The ACC system accomplishes this through automatic acceleration, deceleration and/or braking. Thus, the vehicle having the ACC system (which will be referred to herein as the host vehicle) maintains a safe distance from the vehicle driving directly in front of the host vehicle (this vehicle will be referred to the target vehicle) as a function of road speed.

Typically prior art adaptive cruise control systems include an adaptive cruise control processor, a radar sensor, a brake intervention system, a display unit, an engine intervention system, a plurality of sensors (i.e., wheel speed, yaw rate, steering wheel angle, lateral acceleration), and a transmission intervention system. Typically, the radar sensor operates at a frequency of 76 to 77 gigahertz, which was specifically allocated for ACC systems. In operation, radar beam is emitted by the host vehicle and is reflected off of the target vehicle back toward the host vehicle. The propagation time, dopier shift, and amplitude of the emitted and reflected radar waves are compared. From this comparison, the range or distance, relative speed and relative position between the target and host vehicles are calculated.

One significant problem for ACC systems to overcome is to ensure reliable operation of the system in varying situations such as curves in the road and/or during lane changes. For proper system operation, it is essential that the target vehicle is correctly identified and the lane in which the target vehicle is located is also identified. Prior art systems obtain information from a yaw rate sensor, a steering wheel angle sensor, wheel speed sensors, and lateral speed sensors to determine the target vehicle's lane location and curve status. Other systems under consideration for determining vehicle location are video imaging systems.

Methods found in literature use the yaw rate and the vehicle speed to calculate the curvature of the road. The shortcomings of this method are: first, the path or curvature of the road cannot be accurately predicted and second, any prediction is highly affected by the driver behavior. The first shortcoming is due to the fact that the calculated curvature from the yaw rate and the speed measurements represents the road curvature at the host vehicle position, and the sensors used have different kinds of measurements errors. The latter shortcoming is due to driver habit where he or she doesn't follow the road curvature, e.g., during a lane change. Other prior art methods that use target information to estimate the curvature of the road assume that the host vehicle is always following the road. Therefore, these methods fail when a host vehicle maneuvers or changes lanes.

Therefore, what is needed is a new and improved method for overcoming these shortcomings. This new and improved method should accurately predict the location of the target vehicle without the need for extensive experimental data.

SUMMARY

The method of the present invention utilizes what will be referred to as a projected host vehicle reference frame. The projected host reference frame results from rotating a host vehicle reference frame to align the host vehicle reference frame with a road reference frame. This is achieved by determining whether the host vehicle is changing lanes and accounting for a heading angle of the host vehicle with respect to the road. In addition, the present invention utilizes stopped and moving objects to obtain the maximum benefit of the existing objects in the radar field of view. Moving objects are perceived in two ways, first as moving object with history, and second as a stopped object at the current time. Also, the stopped objects such as a guardrail or a row of trees on a road side can perceived as a fictitious moving object that travels at the host vehicle speed.

In an aspect of the present invention, a method for estimating the curvature in a road is provided. This method uses an azimuth angle range and relative velocity between a host and a target vehicle radar measurement to determine whether the host vehicle is changing lanes or whether the target vehicle is changing lanes.

In another aspect of the present invention, the method calculates a heading angle of the host vehicle and calculates a corrected azimuth angle by adjusting the measured azimuth angle by the value of calculated heading angle In a further aspect of the present invention, the method selects a curve that minimizes the mean square error between the curve and selected targets, and determines an equation that describes the curve, wherein the equation is used to predict the path ahead of the host vehicle.

These and other aspects and advantages of the present invention will become apparent upon reading the following detailed description of the invention in combination with the accompanying drawings.

DETAILED DESCRIPTION

Figure 1:
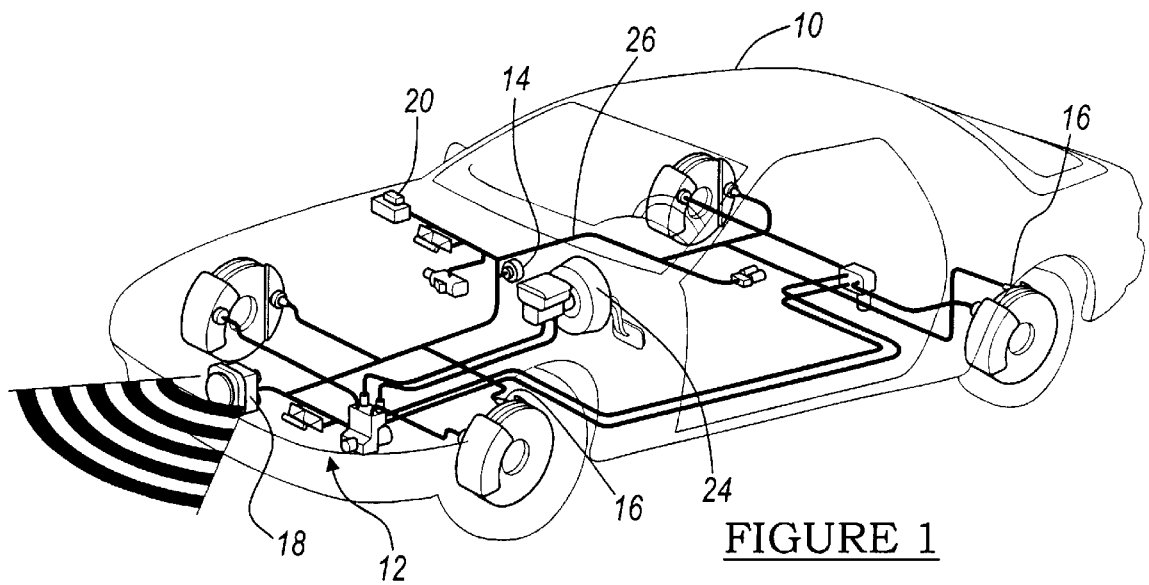
FIG. 1 illustrates a host vehicle having an adaptive cruise control (ACC) system, in accordance with the present invention.

Referring now to FIG. 1, a host vehicle 10 is illustrated having an adaptive cruise control (ACC) system 12, in accordance with the present invention. Adaptive cruise control system 12 includes a plurality of vehicle sensors for measuring various vehicle dynamics parameters. For example, ACC system 12 includes a yaw rate sensor 14 for measuring the yaw rate of host vehicle 10. Other vehicle sensors include a speed sensor 16, for measuring vehicle speed, and a range sensor 18 for detecting objects and other vehicles (target vehicles) in front of host vehicle 10. Further ACC system 12 includes, a control module 20 mounted within host vehicle 10 and in communication with the various sensors, just described, as well as vehicle subsystems such as the vehicle braking system 24 and the vehicle acceleration system (not shown). Preferably a controlled area network (CAN) bus 26 interconnects the various sensors and vehicle subsystems to control module 20.

Figure 2:
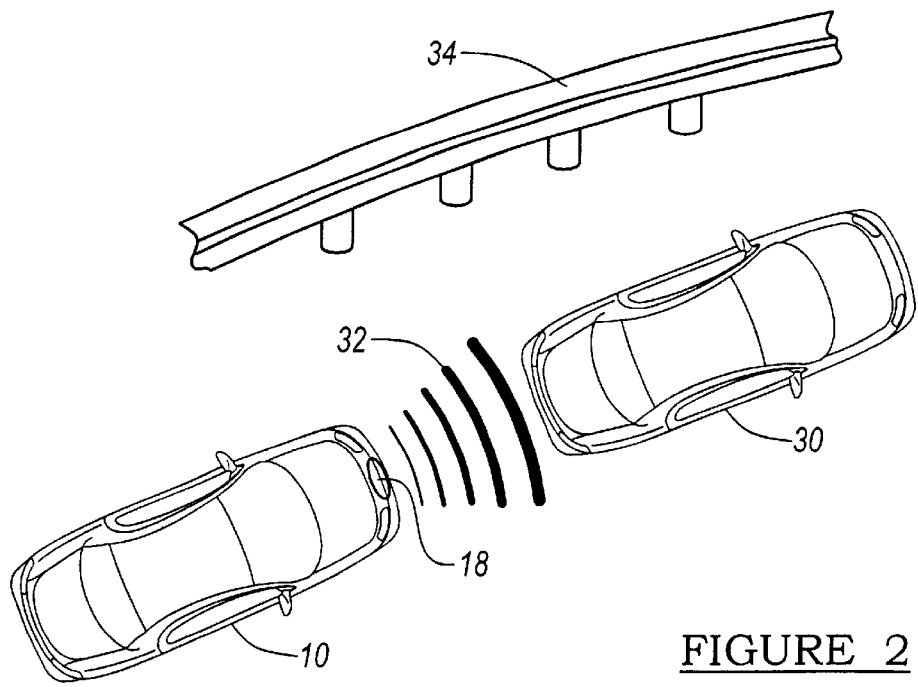
FIG. 2 illustrates a host vehicle following or tracking a target vehicle, in accordance with the present invention.

FIG. 2 is a diagram depicting host vehicle 10 following or tracking a target vehicle 30. Range sensor 18, preferably is a radar sensor that provides relative speed, azimuth angle and distance information of target vehicle 30 or a plurality of vehicles or other objects in the path of host vehicle 10. A fixed radar beam 32 having a frequency of 76 GHz is transmitted from radar sensor 18 for detecting moving objects such as target vehicle 30, as well as stopped objects such as guardrail 34.

In operation, ACC system 12 automatically adjusts the host vehicle's speed and then returns host vehicle 10 to the set or desired speed after the traffic clears. The ACC system 12 in order to operate properly must determine, out of all of the vehicles and objects in front of the host, which vehicle is the primary target. In order to identify the primary in-lane target vehicle, a reliable estimation of road curvature ahead of the vehicle must be determined.

Figure 3:
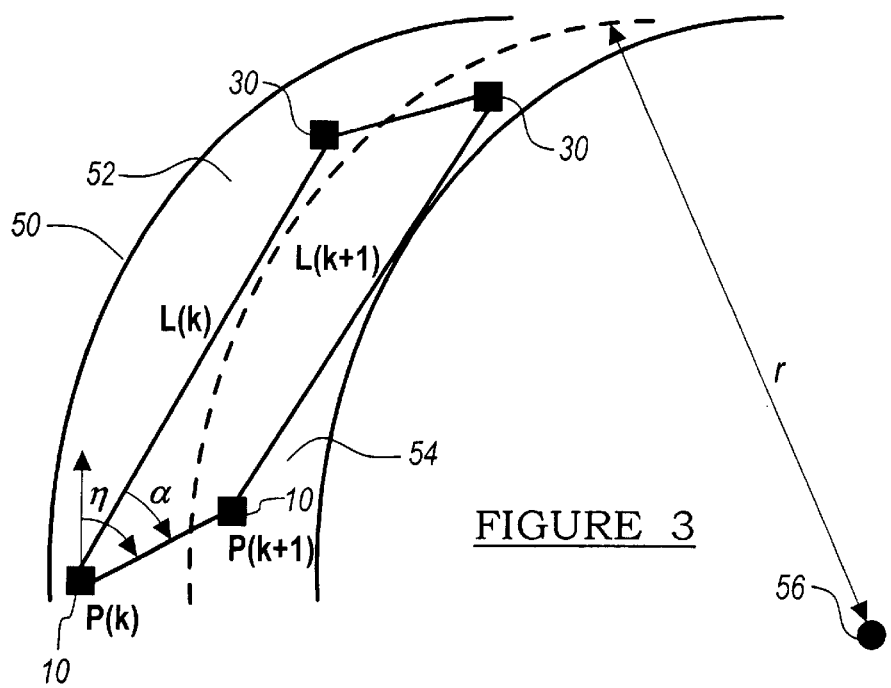
FIG. 3 is a schematic diagram of a host vehicle traveling along a road following target vehicles at a time "k" and "k+1", in accordance with the present invention.

Referring now to FIG. 3, a diagrammatic representation of host vehicle 10 equipped with an ACC system 12 is illustrated traveling along a road 50, wherein road 50 has a left lane 52 and a right lane 54. Host vehicle 10 is further shown following a target vehicle 30. Further, road 50 is curved and has a radius of curvature "r" about a center point 56. As host vehicle 10 travels on road 52, radar sensor 18 measures the range, azimuth angle and relative velocity between host vehicle 10 and target vehicle 30 which is in the same left lane 52 of road 50 as the host vehicle. These radar measurements occur at a time "k" and at a time "k+1". At time "k+1" host vehicle 10 has moved into right lane 54 of road 50 and as illustrated target vehicle 30 also has also moved into lane 54.

FIG. 3 further illustrates azimuth angle "α" and heading angle "η". Heading angle "η" is a result of the directional motion of host vehicle 10 from a first position "p(k)" to a position "p(k+1)" on road 50. The azimuth angle "α" is a function of geometry and orientation of host vehicle 10 with respect to the road 50. The geometry factor is a result of the relative lateral distance between host vehicle 10 and target vehicle 30, as well as the range between them. The orientation of host vehicle 10 with respect to the road is effected by the maneuvering of host vehicle 10 with respect to road 50. For example, in the situation where the relative velocity between the host and the target vehicles is zero, the azimuth angle varies as the host vehicle is rotating around its axis even though the geometry is not changing. In the non-zero relative speed situation, any maneuvering of host vehicle 10 with respect to the road 50 affects the azimuth angle by both the geometry factor and the orientation factor. On the other hand, the maneuvering of the target vehicle with respect to the road effects the azimuth angle measurement by the geometry factor only. Therefore, the geometry factor variation is a combined result of the host and target vehicle maneuvering.

In an aspect of the present invention, a method for predicting road curvature is provided. As will be described hereinafter, this method accounts for host vehicle maneuvering, target vehicle maneuvering, and changes in the curvature of the road.

The present invention assumes that the curvature of the road remains constant between time samples "k" and "k+1". Thus, the variation in the curvature of the road is neglected. The inventor of the present invention believes this to be a valid assumption since the road curvature doesn't change rapidly. Furthermore, the curvature of the road is presumed to follow a circle.

The present invention addresses the difficult task of distinguishing between a host vehicle maneuvering and a lead vehicle maneuvering. This task is not trivial since both types of vehicle maneuvering have almost a similar effect on the azimuth angle measurement. One method is to look to the yaw rate measurement of the host vehicle. This method, however, is not reliable for two reasons: the first by the difficulty of distinguishing the source of the yaw rate, i.e., is it a result of a curve, lane change, or just a yaw rate bias, and second by the noise and drift imposed on the yaw rate measurement. However, a method found to be very reliable, is to follow this rule: when host vehicle maneuvering occurs, all the azimuth angle measurements of the targets in the radar field of view change in the same way, while when a target vehicle maneuvers the azimuth angle measurement of that specific target changes.

Figure 4:
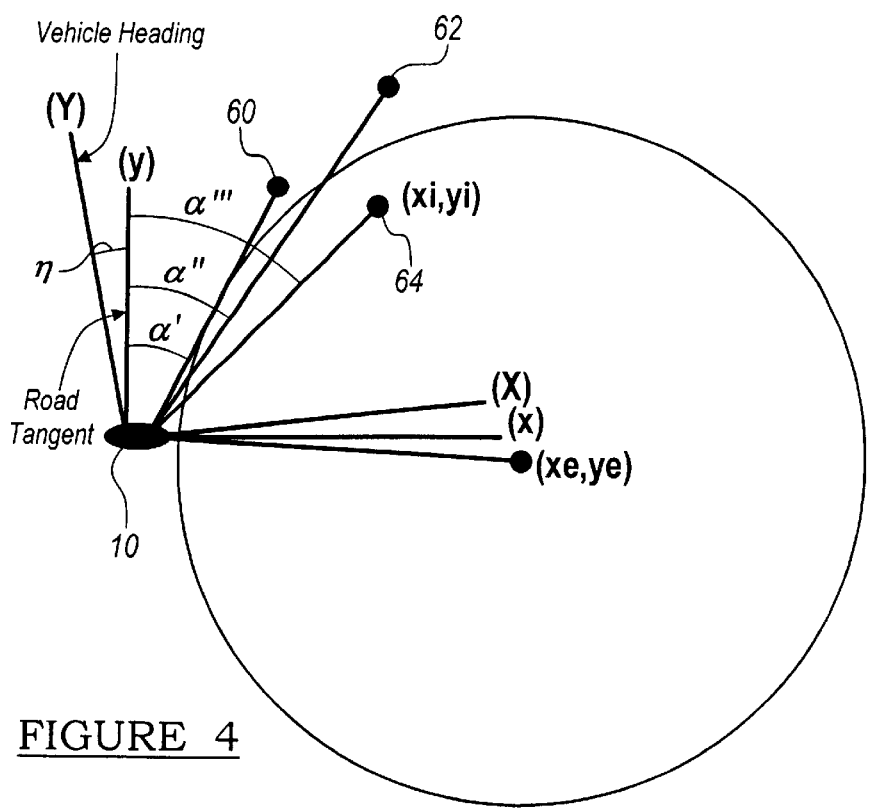
FIG. 4 illustrates a host vehicle tracking a group of targets along a path preceding the host vehicle.
Figure 5:
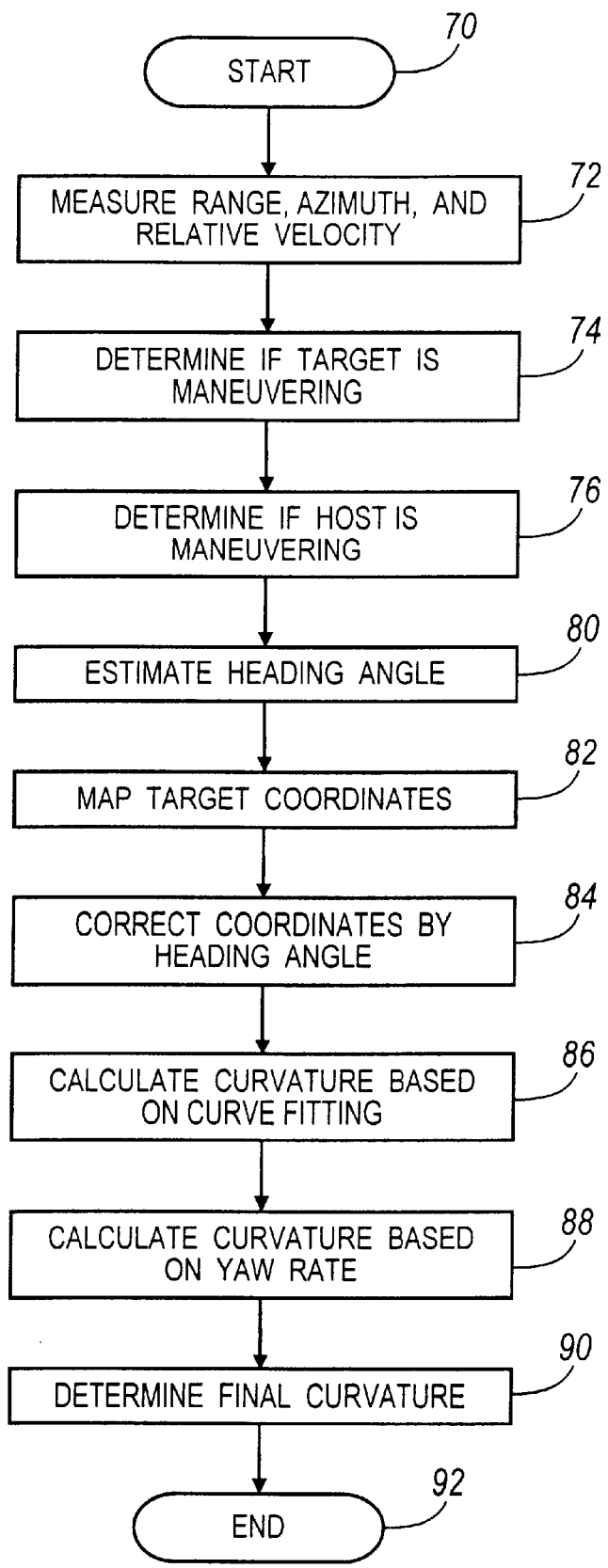
FIG. 5 is a flowchart illustrating the method for determining the curvature of a road.

Referring now to FIGS. 4 and 5, a method for determining a road's curvature will now be described. As shown in FIG. 4, host vehicle 10 has a group of targets 60, 62 and 64 located at points xi and yi along a path preceding host vehicle 10. Furthermore, host vehicle 10 has a heading angle "η" that is defined as the angle between a line tangent to the road and a direction the host vehicle is heading in. A unique azimuth angle "α" is associated with each target 60, 62 and 64. Thus, an azimuth angle α' is the angle between the road's tangent line and a line drawn between the host vehicle 10 and target 60. Similarly, azimuth angle α" is the angle between the road's tangent line and the line drawn between host vehicle 10 and target 62. Finally, the azimuth angle α" is defined as the angle between the road's tangent line and a line drawn between host vehicle 10 and target 64.

With specific reference to FIG. 5, the method for determining the curvature of a road is further illustrated. The method is initiated at block 70, and at block 72, the ACC system of the host vehicle measures the range, azimuth angle, and relative velocity between the host vehicle 10 and each target. It is first determined whether the target object, target vehicle or vehicles are maneuvering, at block 74. At block 76, it is determined whether the host vehicle is maneuvering. The method determines whether the target or host vehicles are maneuvering by following predefined rule: (1) the host vehicle is maneuvering, when all of the azimuth angle measurements of all of the targets change in the same way; or (2) that the target vehicle is maneuvering, when only the azimuth angle of that target is changing and the azimuth angles of the other targets are not changing. Once it is determined whether the host vehicle is changing lanes or whether a target vehicle is changing lanes, the heading angle of the host vehicle with respect to the road may now be estimated. From the geometry of the road and dynamics of the host vehicle, the heading angle "η" can be estimated by solving the following differential equation, as represented by block 80:

$$\frac{V_h}{L}x\alpha + \alpha = -\eta \text{ where:}$$

$V_h$ = the host vehicle speed;

$L$ = the range between the host vehicle and the target vehicle;

$\alpha$ = the azimuth angle between the host vehicle and the target vehicle

The targets coordinates of each target are mapped, as represented by block 82. Further, the method corrects the mapped target coordinates by adjusting (rotating) the mapped target coordinates by the calculated heading angle, as represented by block 84. At block 86, the curvature of the road is calculated fitting a curve through the mapped target coordinates $x_i$ and $y_j$. An optimal curve is selected that minimizes the mean square error of the differences between the curve and each target location. The curve is constrained to be a circle. Thus, the following equation may be used to calculate the center of an optimal circle through the targets:

$$X_c = \frac{\left(\sum_{i=1}^{N} x_i^3 + \sum_{i=1}^{N} X_i y_i^2 - \frac{\sum_{i=1}^{N} x_i y_i}{\sum_{i=1}^{N} y_i^2}\left(\sum_{i=1}^{N} y_i^3 + \sum_{i=1}^{N} x_i^2 y_i\right)\right)}{2\left(\sum_{i=1}^{N} x_i^2 - \frac{\left(\sum_{i=1}^{N} x_i y_i\right)^2}{\sum_{i=1}^{N} y_i^2}\right)}$$

$$y_c = \frac{\left(\sum_{i=1}^{N} y_i^2 + \sum_{i=1}^{N} x_i^2 y_i - 2x_c \sum_{i=1}^{N} x_i y_i\right)}{2\sum_{i=1}^{N} y_i^2}$$

The radius of curvature of the optimal circle through the targets may be calculated using the equation: $(x_i - x_c)^2 + (y_i - y_c)^2 = r^2$. Next, at block 88, a conventional method for calculating road curvature using yaw rate is utilized to identify an alternate road curvature calculation. This conventional curvature calculation using yaw rate is for example, similar to the method disclosed in U.S. Pat. No. 5,926,126 entitled "Method And System For Detecting An In-Path Target Obstacle In Front Of A Vehicle" and is incorporated herein by reference. Furthermore, a final road curvature is calculated by fusing (combining) the two calculations mv,x.z. Fusion of the yaw rate based road curvature calculation and target based road curvature calculation is achieved by following the following rule as the change in the yaw rate increases the weight of the yaw-rate based curvature decreases, and as the number of targets increases the weight of the target based curvature increases.

As any person skilled in the art of geometric based path prediction methods will recognize from the previous detailed description and from the figures and claims, modifications and changes can be made to the preferred embodiments of the invention without departing from the scope of this invention defined in the following claims.

What is claimed is:

1. A method for estimating a radius of curvature in a road, the method comprising:

measuring a range and an azimuth angle between a host vehicle and a plurality of target vehicles;

determining one of whether the host vehicle is changing lanes and whether a primary target vehicle in the plurality of target vehicles is changing lanes;

calculating a heading angle of the host vehicle, wherein calculating a heading angle ($\eta$) further comprises calculating the heading angle as defined by:

$$\frac{V_h}{L}x\alpha + \alpha = -\eta \text{ where:}$$

$V_h$ = the host vehicle speed;

$L$ = the range between the host vehicle and the target vehicle;

$\alpha$ = the azimuth angle between the host vehicle and the target vehicle;

calculating a corrected azimuth angle by adjusting the measured azimuth angle by the calculated heading angle;

selecting a curve that minimizes a mean square error between the selected curve and a plurality of measured locations of the plurality of target vehicles; and determining an equation that describes the curve, wherein the equation is used to determine the radius of curvature of the road ahead of the host vehicle.

2. The method of claim 1 further comprising measuring a relative velocity between the host and target vehicles.

3. The method of claim 1 wherein the heading angle is defined as the angle between a line tangent to the road and a direction the host vehicle is heading in.

4. The method of claim 1 wherein measuring the azimuth angle further comprises measuring the azimuth angle between a plurality of stopped and moving targets.

5. The method of claim 1 wherein determining whether one of a host vehicle and a primary target vehicle is changing lanes further comprises determining whether the azimuth angle between the host vehicle and the plurality of target vehicles is changing in the same way.

6. The method of claim 1 wherein calculating a corrected azimuth angle further comprises rotating the measured azimuth angle by the calculated heading angle.

7. The method of claim 1 wherein selecting a curve further comprises selecting a circle having a predefined radius.

8. A method for estimating a radius of curvature in a road, the method comprising:

measuring a range and an azimuth angle between a host vehicle and a plurality of target vehicles and a plurality of stopped targets;

measuring a yaw rate of the host vehicle;

determining one of whether the host vehicle is changing lanes and whether a primary target vehicle in the plurality of target vehicles is changing lanes;

calculating a heading angle of the host vehicle;

calculating a corrected azimuth angle by adjusting the measured azimuth angle by the calculated heading angle;

calculating a radius of curvature of the road based on the measured yaw rate of the host vehicle;

selecting a curve that minimizes a mean square error between the selected curve and a plurality of measured locations of the plurality of target vehicles and the plurality of stopped targets;

determining an equation that describes the curve, wherein the equation is used to predict the radius of curvature of the road ahead of the host vehicle; and calculating a final radius of curvature of the road by considering both the calculated curvature of the road based on the measured yaw rate and the predicted radius of curvature based on the equation of the selected curve.

9. The method of claim 8 wherein the heading angle is defined as the angle between a line tangent to the road and a direction the host vehicle is heading in.

10. The method of claim 9 wherein calculating a heading angle ($\eta$) further comprises calculating the heading angle as defined by:

$$\frac{V_h}{L} x \alpha + \alpha = -\eta \text{ where:}$$

$V_h$ = the host vehicle speed;
$L$ = the range between the host vehicle and the target vehicle;
$\alpha$ = the azimuth angle between the host vehicle and the target vehicle 11. The method of claim 8 wherein determining whether one of a host vehicle and a primary target vehicle is changing lanes further comprises determining whether the azimuth angle between the host vehicle and the plurality of target vehicles Is changing in the same way.

12. The method of claim 8 wherein calculating a corrected azimuth angle further comprises rotating the measured azimuth angle by the calculated heading angle.

13. The method of claim 8 wherein selecting a curve further comprises selecting a circle having a predefined radius.

* * * * *

UNITED STATES PATENT AND TRADEMARK OFFICE
CERTIFICATE OF CORRECTION

PATENT NO.   : 6,643,588 B1
DATED        : November 4, 2003
INVENTOR(S)  : Faroog Abdel-Kareem Ibrahim It is certified that error appears in the above-identified patent and that said Letters Patent is hereby corrected as shown below:

Column 7,
Line 12, delete "target vehicl" and substitute -- target vehicle. -- in its place.

Column 8,
Line 5, delete "Is" and substitute -- is -- in its place.

Signed and Sealed this

Twentieth Day of January, 2004

JON W. DUDAS
*Acting Director of the United States Patent and Trademark Office*